March 15, 1960 P. M. LA HUE 2,928,282
GYROSCOPIC APPARATUS
Filed June 25, 1958 2 Sheets-Sheet 1

INVENTOR.
PHILIP M. LA HUE
BY Roger W. Jensen
ATTORNEY

March 15, 1960 P. M. LA HUE 2,928,282
GYROSCOPIC APPARATUS
Filed June 25, 1958 2 Sheets-Sheet 2

INVENTOR.
PHILIP M. LA HUE
BY Roger W. Jensen
ATTORNEY

United States Patent Office 2,928,282
Patented Mar. 15, 1960

2,928,282

GYROSCOPIC APPARATUS

Philip M. La Hue, St. Paul, Minn., assignor to Minneapolis-Honeywell Regulator Company, Minneapolis, Minn., a corporation of Delaware Application June 25, 1958, Serial No. 744,410

13 Claims. (Cl. 74—5.37)

This invention pertains generally to gyroscopic devices and more specifically to gyroscopically stabilized platforms. The gyroscopic means used on the stabilized platforms may be of a variety of forms, one type of gyroscopic means widely used at the present time being the floated integrating gyroscope which comprises a rotor member mounted for rotation about a spin reference axis in a gimbal which in turn is mounted in a casing for rotation about an output axis which is generally perpendicular to the spin reference axis. The gimbal is buoyed up by a viscous fluid in substantial neutral suspension so that there is little direct loading on the bearings which define the output axis. Each gyroscope has an input axis (IA) which is perpendicular to both the output axis (OA) and the spin reference axis (SRA). The floated gyroscopes usually include means sensing any rotation of the gimbal about the output axis and for producing a signal proportional to the rotation. The floated gyros also usually include means for applying torques to the gimbal about the output axis for the purpose of tending to rotate the gimbal assembly relative to the outer case or housing about the output axis.

Floated gyros as they are presently known are highly perfected and are very accurate and rugged devices. However, even the finest floated gyroscope known today will tend to have some drift. Drift of a gyro is defined as any unwanted rotation of a gimbal about its output axis. In the present gyroscopes great efforts are expended to minimize the torques causing the drift, but, as indicated, these have not been fully successful. The drifting of the gimbal relative to the case or housing is caused by a variety of factors, the explanation of which is not necessary for an understanding of the present invention. The drift of the gimbal however is important in that the rotation of the gimbal relative to the outer housing caused by the drifting develops error signals which introduce corresponding errors into the system which the gyro controls.

Various arrangements have heretofore been proposed for compensating for the drift of a gyroscope in its control of a stabilized device. One such prior art arrangement involves the use of two gyroscopes for each axis to be stabilized, each gyro being used as a reference part of the time. During the time one gyro is being used for a reference, the rotor or spinning means of the other gyroscope is reversed. Then the second gyro is used as the reference and the rotor means of the first gyro is reversed. This arrangement of shifting the control of the stabilized device back and forth between the two gyros, with the gyro wheels being periodically reversed, theoretically over a period of time will cancel out the errors caused by the drift torques on the individual gyros. However, this arrangement has several disadvantages, one of which is that the switching of control of the stabilized device from one gyro to the other must be very precise and can introduce switching transients which by themselves are sources of error, and furthermore the platform will still drift between the points representing the drift of the individual gyros.

The present invention is directed to an arrangement for stabilizing a device such as a platform by the use of two gyros for each axis of control that overcomes the disadvantages of the prior art arrangements. The present invention uses two gyroscopes for each axis of the platform, the invention being applicable to a platform that is stabilized about one or more axes. The present invention uses one of the gyros as a primary reference which is in full control at all times of the platform and the other gyro is used as a monitor or secondary gyro which monitors the first gyro and develops a signal which is a measure of the drift of the first gyro. The second gyro also will have some drift so that the total output signal of the second gyro will be indicative of the sum of the drift of the primary gyro and of the monitoring gyro. The present invention provides a means for obtaining a first signal which is indicative of the sum of the two gyro drifts and a second signal which is indicative of the difference between the two gyro drifts and further provides means which combine the first and second signals in such a way that the drift of the second or monitoring gyro is cancelled out leaving only the drift of the first or primary gyro as the resultant signal. The invention further provides means for applying a signal as a function of this resultant signal back to the first gyro in a sense so as to apply a correction to the means stabilizing the platform.

The present invention further provides means for introducing into the overall control of the platform correction factors for other variables such as the rate of rotation of the earth and other factors such as coriolis acceleration.

It is an object of this invention therefore to provide an improved gyroscopic apparatus.

A further object of this invention is to provide an improved means for stabilizing a device such as a platform.

These and other objects of this invention will become apparent from a reading of the following specification and appended claims, in conjunction with the accompanying drawings in which:

Figure 1:
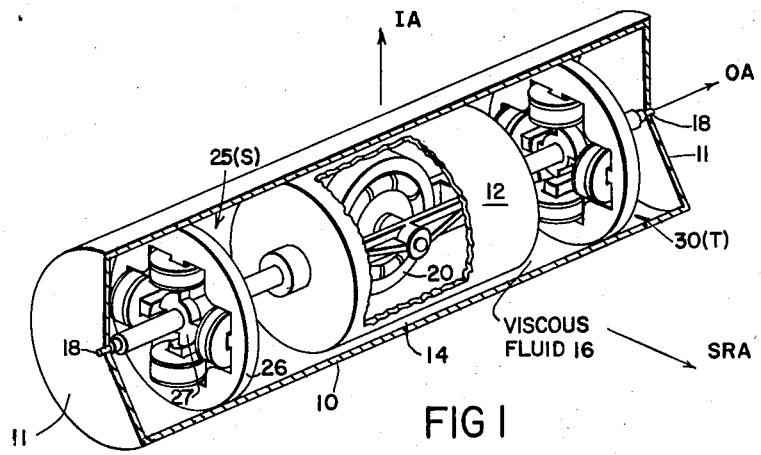
Figure 1 is an isometric view of a floated integrating gyro.

Referring to Figure 1, a floated integrating gyroscope is somewhat schematically shown comprising an outer case or housing 10 having a generally hollow cylindrical shape. A hollow cylindrical gimbal assembly 12 is mounted within the case 10, gimbal assembly 12 having an outer diameter slightly less than the inner diameter of the case. An annular gap 14 is thus defined between the case 10 and the gimbal assembly 12. A viscous fluid 16 is provided inside of housing 10 and completely surrounds the gimbal assembly 12 and fills the restrictive gap 14. The average density of the gimbal assembly 12 is matched as closely as possible to the density of the viscous fluid 16 so that the gimbal assembly 12 is buoyed up in substantially neutral suspension. The gimbal assembly 12 is supported for rotation relative to the case 10 by suitable bearing means 18 supported in the ends 11 of the housing 10.

In Figure 1 the gimbal assembly 12 is cut away to disclose somewhat schematically a spin motor assembly including a rotor member 20. The rotational or spin reference axis of rotor member 20 is identified in Figure 1 by the arrow labeled SRA, the spin reference axis (SRA) being perpendicular to the rotational axis of the gimbal assembly 12 defined by bearings 18, this also being identified as the output axis which is identified on Figure 1 by the arrow OA. The gyroscope has an input axis (IA) which is perpendicular to both the OA and SRA, this axis being identified by a arrow IA in Figure 1.

Any relative rotation between the gimbal assembly 12 and the case or housing 10 is sensed by a signal generating means 25 and which also may be identified by the reference character S. The exact details of the signal generating means 25 are not involved in the present invention, it being sufficient that the signal generating means develops a signal which is a function of the relative rotation between the gimbal assembly 12 and the case. As shown in Figure 1 the signal generating means 25 is an electromagnetic device including a stator member mounted in case 10 and a rotor member 27 attached to the gimbal assembly 12.

Also associated wtih the floated gyroscope shown in Figure 1 is a torque generating means 30 also identified by the reference character T. Again, the exact details of the torque generating or torquer means 30 are not vital to an understanding of the present invention, the primary requirement being to provide a means which will apply controllable torques to the gimbal assembly 12 so as to tend to rotate it relative to the case 10. As shown in Figure 1 the torque generating means 30 is shown to be similar to the signal generating means 25 in that it is an electromagnetic device including a stator member attached to the case 10 and a rotor member secured to the gimbal assembly 12.

It will be appreciated that the gimbal assembly 12 can be rotated relative to the case 10 either by command torques being imposed thereon by the torque generating means 30 or by the entire gyroscopic structure 10 being rotated about the input axis IA. In one mode of operation any rotation of the gyroscopic apparatus about the input axis IA will result in a precession of the gimbal assembly 12 about the output axis OA thus developing a signal in the signal generating means 25. The signal so developed is applied through suitable amplifying means back to the torque generating means 30 so as to develop a torque tending to return the gimbal assembly to its original position or null position. The magnitude of the signal applied to the torquer which is sufficient to exactly oppose the torque imposed upon the gimbal as a result of the rotation about the input axis IA is then a measure of the rate of rotation about the input axis.

Figure 2:
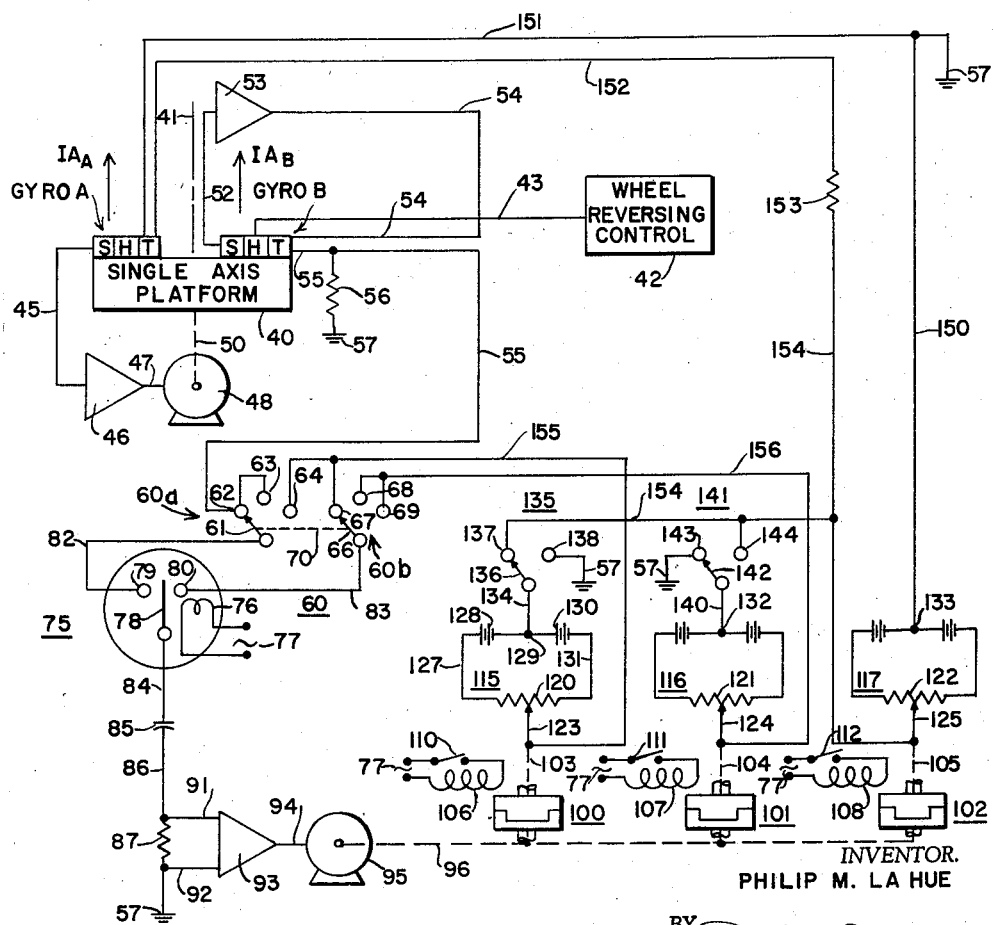
Figure 2 is a schematic diagram of a stabilization arrangement for a platform embodying the principles of this invention.

In Figure 2 a pair of floated gyroscopes A and B are schematically shown to be mounted on a signal axis platform 40. The floated gyros A and B are schematically shown by block diagrams including the letters S, H, and T. The portion S of each of the gyros A and B corresponds to the signal generating means 25 of the typical gyroscope shown in Figure 1. The portion T of each of the floated gyroscopes A and B shown in Figure 2 corresponds to the torque generating means 30 shown on the typical floated gyro shown in Figure 1. The portion H of each of the gyros A and B shown in Figure 2 is symbolic of the rotating wheel 20 within the gimbal assembly 12 of the gyroscope.

The platform 40 is mounted by suitable means for rotation about a platform rotational axis 41. It will be noted that the floated gyroscopes A and B are mounted on the platform 40 so that their input axes $IA_a$ and $IA_b$ respectively are positioned substantially parallel to the platform rotational axis 41. It will be understood that suitable means not shown are provided for energizing the signal generating means and torque generating means of both gyros A and B. Also suitable energization means are provided for rotating the rotor members 20 of the gyros A and B. In addition gyro B has a special wheel reversing control 42 connected thereto through a suitable connection 43 which is effective to selectively reverse the direction of rotation of the rotor or wheel 20 as desired. The exact details of the wheel reversing control are not shown since they are not needed for a full understanding of the invention. In one type of gyro motor wherein the rotor member 20 is electrically driven from a three phase alternating current supply, it will be appreciated that a simple reversing switch may be provided in the energization circuit for the spin motor so as to selectively reverse the direction of rotation of the spin motor.

As shown in Figure 2 the gyroscope A is the primary reference for maintaining the platform 40 stabilized about axis 41. The signal generating means S associated with gyro A is connected through a suitable lead 45 to an amplifier 46 which in turn is connected through a suitable connection 47 to a motor means 48. The motor means 48 is mechanically connected to the single axis platform 40 through a suitable connection 50. It will be understood that rotation of the motor 48 is effective to rotate the single axis platform about its platform axis 41. Under the normal mode of control the gyro A will sense any deviation of the platform 40 about its platform axis 41. This deviation rotates gyro A about its input axis $IA_a$ which will cause the gimbal assembly 12 of gyro A to precess about its output axis relative to its case 10 so as to develop a signal in the signal generating means S which will be coupled through connection means 45, amplifier 46, and connection means 47 to the servomotor means 48, the sense of energization to the motor 48 being so as to return the platform 40 through the mechanical connection 50 to its original position prior to the disturbance.

The control loop from gyro A through amplifying means 46 and servomotor means 48 back to the platform 40 upon which gyro A is mounted is substantially effective to maintain platform 40 stabilized about its rotational axis 41. However, the floated gyro A will tend to drift slowly over a period of time, this drift being a relative rotation between the gimbal assembly 12 and the case 10 which will develop a signal in the signal generating means S associated therewith. A signal so developed will be applied just like a control signal through the above described control loop so as to cause the servomotor 48 to rotate the platform 40 about the platform axis 41. Thus the platform 40 is rotated about its rotational axis 41 in response to the drift or error signal from the gyro A just as it was rotated in response to a true control signal stemming from a platform disturbance. It will be appreciated that over a period of time the platform 40 could deviate substantially from its original position about the platform rotational axis 41 due to the drift torques of gyro A.

To compensate for the drifting of gyro A the monitoring or secondary gyro B is provided. Since the input axis $IA_b$ of gyro B is also substantially parallel to the platform rotational axis 41 the gyro B will sense any rotation of platform 40 about its rotational axis 41. It can be assumed that the stabilization loop including gyro A will maintain the platform 40 stabilized about the platform rotational axis 41 as far as any external transient sources of deflection are concerned. Thus gyro B will not develop any steady-state signal as a result of any external disturbance acting on the platform. However, gyro B will sense any steady-state or long term deviation of the platform 40 about its rotational axis 41 caused by the drift of gyro A. There will thus be a signal produced by the signal generating means S of gyro B as a function of the drift of gyro A. In addition gyro B will have a certain amount of its own drift and this also will result in a signal being produced in the signal producing means S associated with gyro B. The resultant signal produced by the signal generating means S associated with gyro B is thus the quantity $(b-a)$, where "a" and "b" designate the drift rates of gyros A and B respectively. The drift "$a$" of gyro A may be considered of a positive sign; the action of the stabilizing loop cancelling out the drift ($a$) causes the platform to rotate at a rate of ($-a$), hence gyro B measures ($b-a$).

A loop is completed between the signal generating means and the torque generating means T of the gyro B. This loop includes the lead 52 connecting signal generating means S to a suitable amplifier 53 which in turn is connected through suitable connection means 54 to the torquer T. The circuit is completed by another connection lead 55 connecting torquer T of gyro B to a resistor 56, the other side of which is grounded as at 57. The action of the loop between the signal generating means S and the torque generating means T of gyro B is as follows. Any signal developed in the signal generating means is amplified in the amplifying means 53 and applied through the torquer T to the resistor 56. The sense of energization to the torque generating means T is such that the gimbal 12 of gyro B will have a torque applied thereto which tends to return the gimbal assembly 12 to a null position, the null position being the point wherein no signal is developed in the signal generating means S of gyro B. A point of equilibrium will be reached for any particular rate of rotation about the input axis $IA_b$ of gyro B wherein the torque tending to rotate the gimbal assembly 12 about its output axis OA as a result of the input disturbance, is matched by an equal and opposite torque produced by the torque generating means T being energized through the loop including connection means 52, 54, and 55, the amplifying means 53 and resistor 56.

A switching means 60 is provided including a first section 60$a$ and a second section 60$b$. Section 60$a$ includes a movable contact 61 and three fixed contacts 62, 63, and 64. Section 60$b$ includes a movable contact 66 and three fixed contacts 67, 68, and 69. A suitable mechanical connection 70 links the movable contacts 61 and 66 so that they are ganged together to operate simultaneously.

A suitable synchronous vibrator or chopper 75 is also provided comprising a coil member 76 adapted to be connected through suitable connection means to a suitable source of alternating current 77. Vibrator 75 also includes a movable contact blade 78 and a pair of fixed contacts 79 and 80. Fixed contact 79 is connected by a lead 82 to the movable contact 61 of section 60$a$ of the switching means 60 and the fixed contact 80 is connected through a lead 83 to the movable contact 66 of section 60$b$ of the switching means 60. The movable contact 78 of the synchronous vibrator 75 is connected through a lead 84, a condenser 85, a lead 86, and a resistor 87 to ground 57. A pair of connection leads 91 and 92 connected to opposite sides of the resistor 87 are connected on their other ends to a suitable amplifier 93 which in turn is connected through suitable connection means 94 to a suitable servomotor means 95 adapted to rotate in accordance to signals received from the amplifying means 93 and which includes a rotatable shaft means schematically shown in Figure 2 by the dotted line 96.

Three selectively coupled clutches 100, 101, and 102 are provided, each having a driving part connected to the output shaft 96 of motor 95 and a driven part 103, 104, and 105 respectively. The normal operation of clutches 100, 101, and 102 is for no coupling to be transmitted from the driving member to the driven member unless coil means associated therewith are energized. The coil means associated with clutches 100, 101, and 102 are respectively identified by reference numerals 106, 107, and 108. Coils 106, 107, and 108 are respectively connected to a suitable source of alternating current 77 through connection means and normally open switches 110, 111, and 112 respectively.

Three potentiometers 115, 116, and 117 are provided and comprise respectively resistive portions 120, 121, and 122 as well as slider portions 123, 124, and 125. The wipers 123, 124, and 125 are respectively connected to the driven portions 103, 104, and 105 of the clutches 100, 101, and 102. The resistive portions 120, 121, and 122 of the potentiometers 115, 116 and 117 are connected in a voltage divider arrangement. Resistive means 120, for example, has one end connected to a suitable connection means 127, a pair of suitable sources of electromotive force 128 and 130, and a suitable connection 131, connector 131 also being connected to the other side of resistance means 120. A center tap 129 is provided between voltage means 128 and 130. It will be appreciated that wiper 123 may be adjusted relative to the resistive portion 120 of the potentiometer 115 so that a potential equal to the potential at junction point 129 is achieved. Further, any deviation of wiper member 123 in one direction or the other away from the zero voltage point will produce a net signal on the wiper 123 of one sense or the other depending upon the sense of movement and of a magnitude dependent upon the magnitude of slider movement. In the same manner voltage divider networks associated with the potentiometers 116 and 117 are provided each of these including junction points 132 and 133 respectively corresponding to junction point 129. Junction point 129 is connected through a suitable lead 134 to a movable arm 136 of a switch means 135 having a pair of fixed contacts 137 and 138. Fixed contact 138 is grounded as at 57 and a switch 135 is shown with its movable contact 136 engaging fixed contact 137.

Junction point 132 is connected through a suitable lead 140 to the movable contact member 142 of a switch means 141 having a pair of fixed contacts 143 and 144. Contact 143 is grounded as at 57 and switch 141 is shown with movable contact 142 engaging fixed contact 143.

Junction point 133 of the voltage divider network associated with potentiometer 117 is connected through a lead 150 to ground 57 and it will be noticed that a lead 151 is also connected between ground 57 and the torquer T associated with gyro A. The ungrounded side of torquer means T associated with gyro A is connected through a suitable lead 152 and a voltage dropping resistor 153 and a suitable lead 154 to the wiper member 125 associated with potentiometer 117. Lead 154, in addition to connecting resistor 153 to wiper member 125, also is connected to fixed contacts 137 and 144 of switch means 135 and 141 respectively. The wiper member 123 associated with the potentiometer 115 is connected through a suitable lead 155 to the fixed contacts 64 and 67 of the switch means 60$a$ and 60$b$ respectively. A suitable connection means 156 connects the wiper 124 associated with potentiometer 116 to the fixed contacts 68 and 69 of the switch means 60$b$. Fixed contacts 62 and 63 of the switch means 60$a$ are connected through lead 55 to the ungrounded side of resistor 56 in the torquer circuit of gyro B.

Operation of Figure 2

The apparatus shown in Figure 2 is first assumed to be operating with both gyros A and B being energized, that is their signal generating means, torque generating means and spin motors being energized. The rotor member 20 of gyro B may be assumed to be rotating in a plus or positive direction under the action of the wheel reversing control 42. In this mode of operation, as is the case at all times, the primary reference gyro A is effective to sense any deviations of the platform 40 about its platform axis 41 and to apply corrective signals from its signal generating means S through the amplifier 46 so as to control the servomotor 48 to drive the platform 40 back to its original position relative to axis 41. Gyro B will sense the ($-a$) rotation of the platform 40 about its rotational axis 41 due to the drift ($a$) of gyro A and a signal of "$-a$" will accordingly be developed in its signal generator means S. Also a signal of "$b$" will be added to the signal "$-a$" in the signal generating means S of gyro B due to the drift "b" of gyro B. Thus the signal from the signal generating means S of gyro B at this time may be expressed as $(b-a)$. The signal $(b-a)$ developed by signal generating means S of gyro B is applied through amplifying means 53, connection means 54, torquer T of gyro B, lead 55, and resistor 56 to ground. The signal applied to the torquer T on gyro B develops a torque acting on the gimbal 12 of gyro B that will be equal and opposite to the torque caused by the drifting of gyros A and B. The signal developed across resistor 56 is applied through connection lead 55 to fixed contact 62 of section 60a of the switching means 60 and hence through movable contact 61 and connection means 82 to the fixed contact 79 of the synchronous chopper 75. At this time it may be assumed that the wipers 123, 124, and 125 are all at their null positions relative to their voltage divider networks so that no voltages are impressed thereon. Hence at this time there is no voltage applied to the other fixed contact 80 of the synchronous chopper 75. The circuit for fixed contact 80 at this time includes lead 83, movable contact 66 and fixed contact 67 of switch means 60b, lead 155, potentiometer 115 and its energizing network, lead 134, movable contact 136 and fixed contact 137 of switch means 135, lead 154, potentiometer 117 and its energizing network, lead 150 and ground 57. The synchronous chopper winding 76 is energized by alternating source 77 and causes the movable contact 78 to vibrate at its synchronous frequency. The voltage present on the fixed contacts 79 and 80 will be applied alternately to the movable contact 78 and thence through the series network of lead 84, capacitor 85, lead 86 and resistor 87 to ground 57. The voltage developed across resistor 87 is applied through leads 91 and 92 to amplifier 93. The control voltage applied to amplifier 93 is indicative of the difference between the voltages present on contacts 79 and 80 of the chopper. Since at this time there is only a voltage equal to the quantity $(b-a)$ on contact 79 and no voltage on contact 80 the net signal applied to amplifier 93 is indicative of the quantity $(b-a)$. This signal is then amplified and is applied to the motor 95 through lead 94 causing rotation of the shaft 96. At this time switch 110 is closed energizing the clutch 100 through the coil 106 so as to couple the rotation of shaft 96 through to the driven part 103 so as to drive the wiper 123 of potentiometer 115. The motor 95 will continue to rotate until wiper 123 has been displaced a sufficient amount so as to develop a voltage on contact 80 of the chopper 75 equal to the voltage present on contact 79. It will be appreciated therefore that motor 95 will run until a voltage is developed by potentiometer 115 that will be indicative of the quantity $(b-a)$. This completes the first step of the first cycle.

To commence, the second step of the first cycle switch 110 is opened, switch 111 is closed, switch means 60 is moved to the position corresponding to movable contacts 61 and 66 being in engagement with fixed contacts 63 and 68 respectively, and the wheel reversing control means 42 is utilized so as to reverse the direction of rotation of the rotor member 20 associated with the gyro B so that it rotates in the $(-)$ direction. The closing of switch 111 then is effective to couple any rotation of shaft 96 to the wiper 124 of the potentiometer 116 and the opening of switch 110 decouples wiper 123 of potentiometer 115 from the motor 95.

In this second step of the first cycle, the rotor of gyro B has been reversed from the first step. However the gimbal of gyro B will tend to drift in the same direction as in step one so that once again a signal of $(b)$ is developed in the signal generating means S of gyro B. Gyro A continues its control of servomotor 48 and its drift $(a)$ as well as the rotation $(-a)$ of the platform 40 about axis 41 may be assumed to be the same as before. Due to the reversal of wheel 20 of gyro B, the input $(-a)$ about input axis $IA_b$ causes a signal of $(+a)$ to be developed in the signal generating means S of gyro B to be added to the signal $(+b)$ caused by the drift torque of gyro B. Therefore now the signal produced by the signal producing means S of gyro B is indicative of the quantity $(b+a)$ and this signal again is applied to torquer T of gyro B and resistor 56 and through lead 55 to contact 63 of the switch means 60a and thence through movable contact 61 and lead 82 to fixed contact 79 of the synchronous chopper 75. At this time the fixed contact 80 of chopper 75 is connected through lead 83, movable contact 66 and fixed contact 68 of switch means 60b, and lead 156 to wiper 124 of potentiometer 116. The junction point 132 of the network energizing potentiometer 116 is connected through lead 140, switch arm 142 and fixed contact 143 of switch means 141 to ground 57. Since there is no voltage at this time on wiper 124, it follows that motor 95 will be energized in the same manner as in step one and will be effective to drive through its output shaft 96 and the driven part 104 of clutch 101 to displace the wiper 124 relative to its resistive member 121 so as to develop a voltage on contact 80 of the synchronous chopper 75 equal to the voltage $(b+a)$ appearing on contact 79. The loop including motor 95 will finally stabilize when the voltage $(b+a)$ appears at wiper 124 of potentiometer 116. This completes step two of the first cycle.

The third step of the first cycle involves the moving of switch 60 so that movable contacts 61 and 66 are in engagement with fixed contacts 64 and 69 respectively. Also, at this time switch means 135 and 141 are displaced from the positions as shown in Figure 2 to the position wherein movable switch arms 136 and 142 are in engagement with fixed contacts 138 and 144 respectively. Also, at this time, clutches 100 and 101 are de-energized and clutch 102 is energized by having switches 110 and 111 open and switch 112 closed. At this time the wiper 123 is connected to contact 79 of synchronous chopper 75. The complete circuit for contact 79 at this time includes connection lead 82, movable contact 61 and fixed contact 64 of switch means 60a, lead 155, wiper 123 of potentiometer 115, the voltage divider network energizing the resistive portion 120 of potentiometer 115, lead 134, and switch member 136 and fixed contact 138 of switch means 135 to ground 57. Also at this time the fixed contact 80 of the synchronous chopper 75 is connected to wiper 124 of the potentiometer 116 through the circuit including lead 83, movable contact 66 and fixed contact 69 of the switch means 60b, lead 156, to wiper 124. At this time the junction point 132 of voltage divider network energizing potentiometer 116 is connected through lead 140, switch member 142 and fixed contact 144 of switch means 141, and lead 154 to the wiper 125 of potentiometer 117 as well as being connected through resistor 153 to the torquer T associated with the gyro A on the platform 40. It will be recalled that the quantity $(b-a)$ appears on wiper 123 of potentiometer 115 at this time and the quantity $(b+a)$ is present on the wiper 124 of potentiometer 116. It has been demonstrated how wipers 123 and 124 are effectively connected to the fixed contacts 79 and 80 of the synchronous chopper 75. Thus the quantity $(b-a)$ is on contact 79 and the quantity $(b+a)$ is on contact 80. Hence motor 95 will be energized by a signal of a magnitude indicative of the quantity $(-2a)$, the circuit effectively subtracting one from the other. Motor means 95 will drive through the energized clutch 102 so as to position the wiper 125 of the potentiometer 117 at a value corresponding to $(-2a)$ is then applied through the voltage dropping resistor 153 which is selected to be of the proper size so as to cause one-half of the voltage to be dropped thereacross leaving the remaining voltage of the magnitude $(-a)$ to be impressed on the torquer T associated with the gyro A. By definition the quantity $(a)$ is equal to the drift of gyro A and since a signal of $(-a)$ is being applied to the torquer means T it follows that gyro A will be compensated for its drift by the signal. Accordingly, the platform 40 will be corrected for the drift of gyro A and will remain in its proper relationship about its rotational axis 41.

The entire sequence of operation is then repeated for a second cycle. The three steps are repeated as in the first cycle with the first cycle with the rotor direction of gyro B and the switch operations being controlled in identical fashion. It will be understood that in the second and each succeeding cycle the switch means 60, 135, and 141 will have the same positions corresponding to steps 1, 2, and 3 of the first cycle. Also the energization of clutches 100, 101, 102 and the control of rotation of rotor 20 of gyro B will follow the same pattern as in the first cycle. In the first step of the second cycle, since gyro A has been compensated for its own drift, gyro B detects only its own drift and develops a signal of $(+b)$ which is applied to contact 79 of the synchronous chopper 75, contact 80 of which is connected through potentiometers 115 and 117 to ground 117. Due to the setting of $(-2a)$ in wiper 125 of potentiometer 117 left over from the preceding cycle, the wiper 123 of potentiometer 115 will be adjusted by motor 95 to develop a voltage indicative of the quantity $(b-2a)$. This completes the first step of the second cycle.

The second step of the second cycle again involves the reversing of the rotor 20 in gyro B so that it has a minus sense or direction. Since gyro A has been compensated for its drift, gyro B detects only its own drift and develops a signal of $(+b)$ which is applied to contact 79 of the synchronous chopper, the contact 80 of the synchronous chopper 75 being connected to the wiper 124 of potentiometer 116. Motor 95 will be energized until a signal is developed at wiper 124 of potentiometer 116 equal to the quantity $(+b)$. This completes the second step of the second cycle at which point there is the quantity $(b-2a)$ stored on wiper 123 of potentiometer 115 and the quantity $(b)$ stored on wiper 124 of potentiometer 116. Then the third step of the second cycle is effected wherein wiper 123 is connected to contact 79 and wiper 124 is connected to contact 80 so that we subtract from the quantity $(b-2a)$ the quantity $(b)$ stored respectively on said wipers so that wiper 125 remains at the position indicative of the quantity $(-2a)$. Again this voltage indicative of the quantity $(-2a)$ is passed through the voltage dropping resistor 153 to the torquer T on gyro A so as to maintain the compensation in the stabilization loop for the platform 40 of the drift of gyro A.

The correction cycle involving the three steps then can be repeated as many times as is necessary and as often as is necessary in order to maintain gyro A compensated for its own drift. In some applications after the system has stabilized itself it may no longer be necessary to repeat the cycle if the drift of gyro A has become stabilized and accordingly gyro B may be deenergized.

In the above described arrangement, it has been assumed that the drift $(a)$ of gyro A is a constant quantity and for this condition the wiper 125 of potentiometer 117 would be adjusted to a value indicative of the quantity $(-2a)$. If the drift characteristics of gyro A change which is the usual case the system will detect this and will upon the completion of each cycle, readjust wiper 125 for the new value of drift of gyro A so as to continuously compensate the platform 40.

Figure 3:
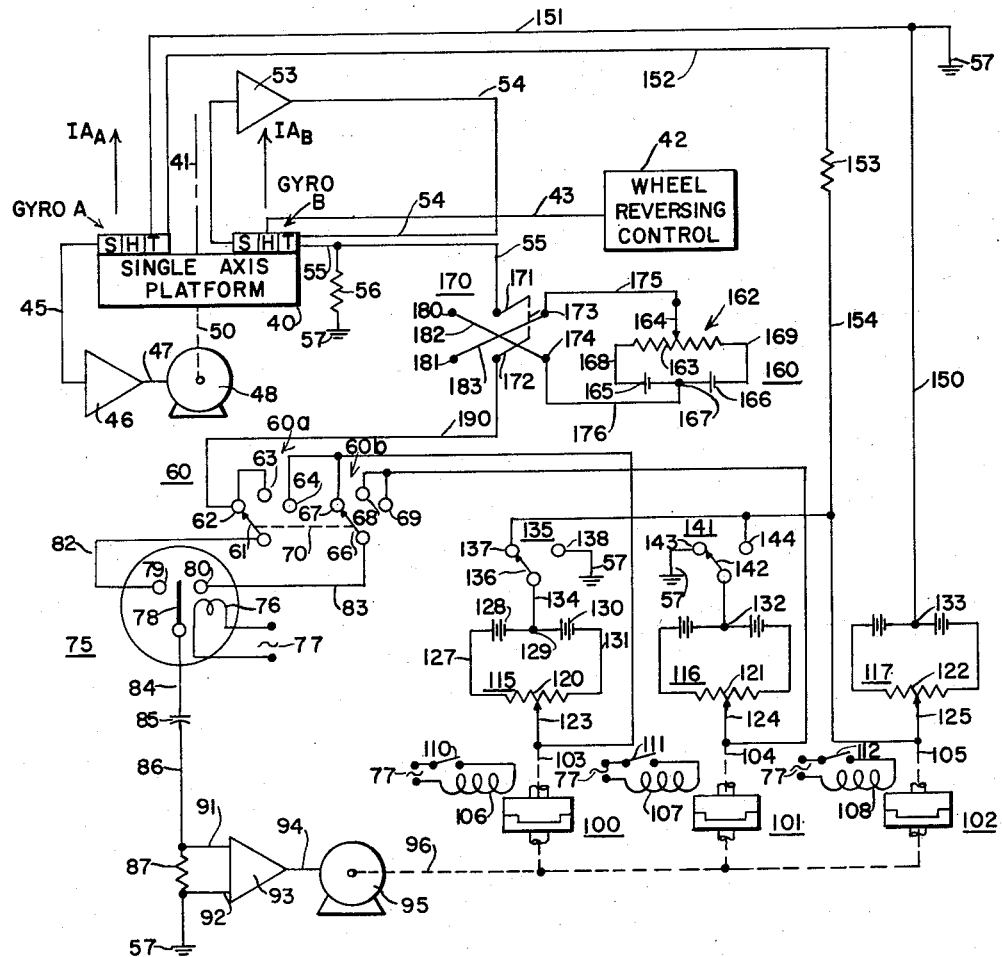
Figure 3 is a schematic diagram of a system similar to that shown in Figure 2 together with means for introducing a correction for additional variables such as the rate of rotation of the earth.

*Operation of Figure 3*

In some system applications it is desirable to introduce corrections into the loop controlling a platform to compensate for factors such as rotation of the earth, Coriolis acceleration, etc. The apparatus shown in Figure 3 is basically the same system shown in Figure 2 plus means for introducing a compensating factor for the rotation of the earth so that the platform 40 may be stabilized relative to the earth in contrast to the system of Figure 2 wherein platform 40 is stabilized for rotation about axis 41 without regard for earth's rotation.

In Figure 3 system elements and components which are identical to elements and components in Figure 2 had been identified by the same reference numerals. A voltage developing bridge circuit 160 is provided including a potentiometer 162 comprising a resistive portion 163 and a wiper member 164. The bridge 160 further includes a pair of sources of electromotive force 165 and 166 each having one side connected to a common junction point 167. One end of resistive portion 163 is connected to the other side of source 165 through a suitable lead 168 and the other end of resistive portion 163 is connected to the other side of source 166 through a suitable lead 169. It will be appreciated that as slider 164 of potentiometer 162 is varied or adjusted along resistive portion 163 that voltage signals of one sense or the other and of a magnitude proportional to the deviation away from null position will be produced. A double pole, double throw switch means 170 is provided comprising in part a pair of switch arms 171 and 172 ganged together and a first pair of fixed contacts 173 and 174 connected respectively to wiper member 164 of potentiometer 162 and to junction point 167 by a pair of suitable leads 175 and 176. A second pair of fixed contacts 180 and 181 of switch means 170 are cross connected to the other or first set of fixed contacts 173 and 174 by a pair of suitable leads 182 and 183. Switch means 170 is connected in circuit with lead 55 associated with the loop from the signal generator S to torque generator T of B and resistor 56. More specifically, lead 55 is connected to movable switch arm 171 of switch means 170 and a new connection means 190 connects movable switch arm 172 of switch means 170 to fixed contacts 62 and 63 of the switch means 60.

For a description of the operation of Figure 3 it may be assumed that it is desired to introduce a correction quantity into the stabilization of platform 40 proportional to the rate of rotation of the earth. To do this any suitable means such as means responsive to the latitude of the platform 40 relative to the earth may be used to compute the rate of rotation of the earth at the location of the platform 40 and to adjust wiper 164 relative to resistive portion 163 of the potentiometer 162 to a position wherein a voltage is developed on wiper 164 indicative of the rate of rotation of the earth. Thus there will appear between contacts 173 and 174 a voltage which may be expressed as $(-E)$ which is the voltage indicative of the rate of rotation of the earth. Due to the cross connection 182 and 183 between the second set of fixed contacts 180 and 181 and the first set of contacts 173 and 174 a voltage of $(+E)$ will be developed between fixed contacts 180 and 181.

The action of the earth's rate compensation means is to superimpose the value of $(-E)$ on the signal produced by gyro B for the first step of the first cycle by having movable switch arms 171 and 172 in engagement with contacts 173 and 174. The signal of $(-E)$ is superimposed upon or added to the signal $(b-a)$ developed by the means described in connection with Figure 2 including gyro B with its loop including its signal generator S, amplifier 53, etc. Thus at the end of the first step of the first cycle, there is a voltage stored on wiper 123 of potentiometer 115 indicative to the quantity $(b-a-E)$. The second step of the second cycle involves reversing switch means 170 so that the movable switch arms 171 and 172 are in engagement with fixed contacts 180 and 181 and at the same time reversing the direction of rotation of rotor 20 of gyro B through the wheel reversing control 42 as well as performing the other switching functions of the system of Figure 2. At the end of the second step of the first cycle the quantity $(b+a+E)$ is stored on wiper 124 of potentiometer 116. Then during the third step of the first cycle the quantity stored on wiper 124 is subtracted from the quantity stored on wiper 123 with the difference signal being stored on wiper 125 of potentiometer 117. Thus the quantity $(b+a+E)$ is subtracted from the quantity $(b-a-E)$ leaving a resultant signal of $(-2a-2E)$ stored on wiper 125 of potentiometer 117. This signal is applied through the voltage dropping resistor 153 to the torque generating means T associated with gyro A to correct gyro A for its drift $(a)$ and to also introduce the factor of $(-E)$ which is the value indicative of the earth's rate of rotation at that particular latitude thus causing platform 40 to be rotated at a rate of $(-E)$ which in effect will keep the platform stabilized about axis 40 relative to the surface of the earth.

The first step of the second cycle involves the rotor 20 of gyro B being reversed again so that it is rotating in the plus direction and switch means 170 is returned to its original position wherein the movable switch arms 171 and 172 are in engagement with fixed contacts 173 and 174. At the end of the first step of the second cycle the quantity $(b-2a-2E)$ is stored on wiper 123 of potentiometer 115. The second step of the second cycle involves reversing switch means 170 and also reversing the direction of rotation of rotor 20 of gyro B as well as operating the other switch means as before for step two. At the end of the second step of the second cycle the quantity $(b)$ stored on wiper 124. The third step of the second cycle involves subtracting the quantity stored on wiper 124 from the quantity stored on wiper 123 which leaves a resultant signal of $(-2a-2E)$ stored on wiper 125. It will be appreciated that should the drift of gyro $a$ change or should the value of earth's rate change due to displacement of platform 40 relative to the surface of the earth that these factors will be taken care of since the system of Figure 3 will automatically compensate for any changes in the drift $(a)$ of gyro A and the wiper 164 of potentiometer 162 can be adjusted to accommodate any changes in the value of earth's rate.

It will be understood that the bridge circuit 160 and switch means 170 can introduce other correction factors. For example, instead of introducing an earth's rate correction factor, the means 160 and 170 could be used to introduce a correction of Coriolis acceleration by having wiper 164 of potentiometer 162 adjusted for this value. Again means would have to be provided for sensing or determining or computing the Coriolis acceleration, such means being beyond the scope of the present invention. It will be further appreciated that a plurality of correction signals could be simultaneously applied to introduce correction quantities into the stabilization of platform 40.

Another variation of the means for injecting the correction signal for earth's rate of rotation or other factor into the stabilization of platform 40 would be to apply a correction signal directly to the torquer of gyro B so as to cause a rotation of the gimbal 12 of gyro B about its output axis in an amount indicative of the correction desired so that a signal would be produced at the signal generating means S associated with gyro B which signal would appear on the output lead 55 and thence directly to fixed contact 62 of switch means 60.

It will be understood that the present arrangement of this invention provides a means of stabilizing a platform 40 about a rotational axis 41 that is extremely accurate and reliable in that it maintains the platform at all times under the control of primary reference and does not introduce any errors such as switching transients by switching back and forth between a pair of primary references as the above discussed prior art method. Also the present invention has the advantage, as indicated above, that if the drift characteristics of the system stabilize after a period of time then the auxiliary or secondary reference gyro B can be deenergized and gyro A left in complete control without adjustment. Further, and of great importance, is the fact that the drift rate of the platform is essentially zero and does not vary from a value corresponding to the drifts of the two references that the prior art arrangement uses.

While I have shown and described the specific embodiment of this invention, further modifications and improvements will occur to those skilled in the art. I desire to be understood, therefore, that this invention is not limited to the particular form shown and I intend in the appended claims to cover all modifications which do not depart from the spirit and scope of this invention.

What I claim is:

1. In apparatus of the class described: a platform adapted to be stabilized about a platform axis; motor means which when energized is effective to rotate said platform about said axis; a primary gyroscope; a secondary gyroscope, said gyroscopes each comprising rotor means adapted to spin about a spin reference axis and mounted on a gimbal adapted to rotate about an output axis normal to said spin reference axis and having an input axis normal to both said spin reference axis and said output axis; means mounting said gyroscopes on said platform so that the gyroscope input axes are substantially parallel to said platform axis; signal generating means associated with each of said gyroscopes effective to generate signals as a function of rotation of said gimbals about said output axes; torque generating means associated with each of said gyroscopes effective when controlled to generate torques tending to rotate said gimbals about said output axes; means connecting the signal generating means of said primary gyroscope to said motor means so that said motor means is energized as a function of signals produced by said primary gyroscope signal generating means, said motor means being effective upon receiving a signal from said primary gyroscope signal generating means to drive said platform about said platform axis in a direction to precess said primary gyroscope in a sense so as to reduce toward zero said signal of said primary gyroscope signal generating means; means connecting the signal generating means of said secondary gyroscope to said torque generating means of said secondary gyroscope; means connected to said secondary gyroscope for periodically reversing the direction of rotation of said rotor means of said secondary gyroscope; first signal storing means for storing the signal from said signal generating means of said secondary gyroscope when said rotor means thereof is spinning in one sense; second signal storing means for storing the signal from said signal generating means of said secondary gyroscope when said rotor means thereof is spinning in the opposite sense; means subtracting the second stored signal from the first stored signal to produce a difference signal; and means including signal dividing means connecting said subtracting means to said torque generating means of said primary gyroscope so that a function of said difference signal is applied to said torque generating means of said primary gyroscope.

2. In apparatus of the class described: a platform adapted to be stabilized about a platform axis; motor means which when energized is effective to rotate said platform about said axis; a primary gyroscope; a secondary gyroscope, said gyroscopes each comprising rotor means adapted to spin about a spin reference axis and mounted on a gimbal adapted to rotate about an output axis normal to said spin reference axis and having an input axis normal to both said spin reference axis and said output axis; means mounting said gyroscopes on said platform so that the gyroscope input axes are substantially parallel to said platform axis; signal generating means associated with each of said gyroscopes effective to generate signals as a function of rotation of said gimbals about said output axes; torque generating means associated with each of said gyroscopes effective when controlled to generate torques tending to rotate said gimbals about said output axes; means connecting the signal generating means of said primary gyroscope to said motor means so as to substantially stabilize said platform about said platform axis; means connecting the signal generating means of said secondary gyroscope to said torque generating means of said secondary gyroscope; means connected to said secondary gyroscope for periodically reversing the direction of rotation of said rotor means of said secondary gyroscope; first signal storing means for storing the signal from said signal generating means of said secondary gyroscope when said rotor means thereof is spinning in one sense; second signal storing means for storing the signal from said signal generating means of said secondary gyroscope when said rotor means thereof is spinning in the opposite sense; and means including subtracting means for subtracting one of said stored signals from the other of said stored signals and for producing a resultant signal which is a function of the difference of said stored signals; and means connecting said means including said subtracting means to said torque generating means of said primary gyroscope so that said resultant signal is applied to said torque generating means of said primary gyroscope.

3. In apparatus of the class described: a platform; means rotatably mounting said platform for rotation about a platform axis; a first gyroscope and a second gyroscope each having rotor means and being mounted on said platform with the input axes of said gyroscopes being substantially parallel to said platform axis; means including said first gyroscope and a servo system for stabilizing said platform about said platform axis; means for selectively reversing the direction of rotation of the rotor means of said second gyroscope; means connected to said second gyroscope for producing a signal as a function of the output thereof; first signal storing means for storing the signal from said signal producing means when said rotor means of said second gyroscope is rotating in one sense; second signal storing means for storing the signal from said signal producing means when said rotor means of said second gyroscope is rotating in the opposite sense; means for subtracting the signal stored by said second signal storing means from the signal stored by said first signal storing means to produce a difference signal; and means for applying a function of said difference signal to said first gyroscope so as to apply to said platform a correction signal as a function of said difference signal.

4. In apparatus of the class described: a platform mounted for rotation about a platform axis; first gyroscope means and second gyroscope means each having rotor means and being mounted on said platform with the input axes of said gyroscope means being substantially parallel to said platform axis; means including said first gyroscope means for stabilizing said platform about said platform axis; means for reversing the direction of rotation of the rotor means of said second gyroscope; signal producing means connected to said second gyroscope means; first signal storing means for storing the signal from said signal producing means when said rotor means of said second gyroscope is rotating in one sense; second signal storing means for storing the signal from said signal producing means when said rotor means of said second gyroscope is rotating in the opposite sense; means for subtracting the signal stored by one of said signal storing means from the signal stored by the other of said signal storing means to produce a difference signal; and means for applying a function of said difference signal to said platform stabilization means.

5. In apparatus of the class described: a platform mounted for rotation about a platform axis; first gyroscopic means and second gyroscopic means each having rotor means and an input axis and each being mounted on said platform with said input axes of said gyroscopic means being substantially parallel to said platform axis; means including said first gyroscopic means for stabilizing said platform about said platform axis; means for reversing the direction of rotation of the rotor means of said second gyroscopic means; signal producing means connected to said second gyroscopic means; computing means connected to said signal producing means, said computing means producing a signal which is a function of the difference between the signal from said second gyroscopic signal producing means when said rotor means of said second gyroscopic means is rotating in one sense, and the signal from said second gyroscopic signal producing means when said rotor means of said second gyroscopic means is rotating in the opposite sense; and means connecting said computing means to said platform stabilization means so that said computed signal affects the position of said platform about said platform axis.

6. In apparatus of the class described: a platform mounted for rotation about a platform axis; a first gyroscope; a second gyroscope, each of said gyroscopes having rotor means and in input axis and being mounted on said platform with said input axes of said gyroscopes being substantially parallel to said platform axis; servomotor means; means including said first gyroscope and said servomotor means for stabilizing said platform about said platform axis; means for reversing the direction of rotation of the rotor means of said second gyroscope; signal producing means connected to said second gyroscope; computing means connected to said signal producing means for producing a signal which is a function of the difference between the signal from said signal producing means when said rotor means is rotating in one sense and the signal from said signal producing means when said rotor means is rotating in the opposite sense; and means connecting said computing means to said platform stabilization means so that said computed signal affects the position of said platform about said platform axis.

7. In apparatus of the class described: a platform mounted for rotation about a platform axis; first gyroscopic means and second gyroscopic means each having an input axis and an output axis and each being mounted on said platform with said input axes being substantially parallel to said platform axis, said gyroscopic means each being characterized by a gradual drift thereof about said output axes; means including said first gyroscopic means for stabilizing said platform about said platform axis, said drift of said first gyroscopic means tending to cause said platform to rotate about said platform axis; means for producing and storing a first signal indicative of the sum of said drifts of said gyroscopic means; means for producing and storing a second signal indicative of the difference between the drifts of said gyroscopic means; means for combining said first and said second signals; means connecting said combining means to said platform stabilizing means so that a signal as a function of said combined first and second signals is introduced into the control of said platform.

8. In apparatus of the class described: a platform mounted for rotation about a platform axis; first gyroscopic means having an input axis and being mounted on said platform with said input axis being substantially parallel to said platform axis; means including said first gyroscopic means for stabilizing said platform about said platform axis; second gyroscopic means mounted on said platform; means including said second gyroscopic means for producing a signal which is a function of the rotation of said platform about said platform axis caused by drift of said first gyroscopic means; and means connecting said signal producing means to said platform stabilizing means so as to substantially eliminate the positional error of said platform about said platform axis caused by said drift of said first gyroscopic means.

9. In apparatus of the class described: a platform mounted for rotation about a platform axis; first gyroscopic means having an input axis and being mounted on said platform with said input axis being substantially parallel to said platform axis; means including said first gyroscopic means for stabilizing said platform about said platform axis; second gyroscopic means mounted on said platform; means including said second gyroscopic means for producing a signal indicative of the drift of said first gyroscopic means; and means connecting said signal producing means to said platform stabilizing means.

10. In apparatus of the class described: a platform mounted for rotation about a platform axis; gyroscopic means having an input axis and being mounted on said platform with said input axis being substantially parallel to said platform axis; means including said gyroscopic means for stabilizing said platform about said platform axis; means for producing a signal which is a function only of the rotation of said platform about said platform axis caused by drift of said gyroscopic means; and means connecting said signal producing means to said platform stabilizing means so as to substantially eliminate the positional error of said platform about said platform axis caused by said drift of said gyroscopic means.

11. In apparatus of the class described: a platform mounted for rotation about a platform axis; gyroscopic means having an input axis and being mounted on said platform with said input axis being substantially parallel to said platform axis; means including said gyroscopic means for stabilizing said platform about said platform axis; means responsive to platform rotation and adapted to produce a signal which is a function only of the drift of said gyroscopic means; and means connecting said signal producing means to said platform stabilizing means.

12. In apparatus of the class described: a platform mounted for rotation about a platform axis; first gyroscopic means and second gyroscopic means each having an input axis and each having rotor means and being mounted on said platform with said input axes of said gyroscopic means being substantially parallel to said platform axis; means including said first gyroscopic means for stabilizing said platform about said platform axis; means for reversing the direction of rotation of the rotor means of said second gyroscopic means; first signal producing means connected to said second gyroscopic means; second signal producing means for producing a signal indicative of a compensating factor; means for reversing the sense of the signal from said second signal producing means; computing means including said reversing means connected to said signal producing means for producing a signal which is a function of the difference between the signal from said gyroscopic signal producing means when said rotor means of said second gyroscipic means is rotating in one sense and the signal from said gyroscopic signal producing means when said rotor means of said second gyroscopic means is rotating in the opposite sense plus the signal from said second signal producing means; and means connecting said computing means to said platform stabilization means so that said computed signal affects the position of said platform about said platform axis.

13. In apparatus of the class described: a platform mounted for rotation about a platform axis; first gyroscopic means having an input axis and being mounted on said platform with said input axis being substantially parallel to said platform axis; means including said first gyroscopic means for stabilizing said platform about said platform axis; second gyroscopic means mounted on said platform; means including said second gyroscopic means for producing a first signal which is a function of the rotation of said platform about said platform axis caused by drift of said first gyroscopic means; means connecting said signal producing means to said platform stabilizing means so as to substantially eliminate the positional error of said platform about said platform axis caused by said drift of said first gyroscopic means, and means including said signal producing means and said connecting means for combining a signal indicative of a correction factor with said first signal so that said combined signal is applied to said platform stabilization means.

References Cited in the file of this patent

UNITED STATES PATENTS

| 2,293,092 | Wittkuhns | Aug. 18, 1942 |
| 2,771,779 | Schaffer et al. | Nov. 27, 1956 |

FOREIGN PATENTS

| 724,897 | Great Britain | Feb. 23, 1955 |